United States Patent [19]
Deters et al.

[11] Patent Number: 5,350,128
[45] Date of Patent: Sep. 27, 1994

[54] APPARATUS FOR LOADING WINDING TUBES

[75] Inventors: Ludger A. Deters, Remscheid; Frank Adenheuer, Wuppertal, both of Fed. Rep. of Germany

[73] Assignee: Barmag, AG, Fed. Rep. of Germany

[21] Appl. No.: 945,111

[22] Filed: Sep. 14, 1992

[30] Foreign Application Priority Data

Sep. 12, 1991 [DE] Fed. Rep. of Germany ....... 4130300
Feb. 10, 1992 [DE] Fed. Rep. of Germany ....... 4203787

[51] Int. Cl.⁵ .......................................... B65H 67/06
[52] U.S. Cl. ........................ 242/35.50 A; 198/465.1; 198/468.6; 198/468.7; 198/487.1
[58] Field of Search ............... 242/35.5 A; 198/465.1, 198/468.6, 468.7, 487.1; 414/331

[56] References Cited

U.S. PATENT DOCUMENTS

| | | | |
|---|---|---|---|
| Re. 31,839 | 2/1985 | Schippers et al. | 242/35.5 A |
| 3,082,908 | 3/1963 | Ingham . | |
| 3,987,974 | 10/1976 | Mayer | 242/35.5 A |
| 4,023,743 | 5/1977 | Schippers | 242/35.5 A |
| 4,139,108 | 2/1979 | Kamp | 242/35.5 A |
| 4,340,187 | 7/1982 | Schippers et al. | 242/35.5 A |
| 4,702,427 | 10/1987 | Raasch | 242/35.5 A |
| 5,036,967 | 8/1991 | Graber et al. | 242/35.5 A |
| 5,096,357 | 3/1992 | Galbani | 242/35.5 A |
| 5,244,160 | 9/1993 | Hinchlippe et al. | 242/35.5 A |
| 5,292,081 | 3/1994 | Langen et al. | 242/35.5 A |

FOREIGN PATENT DOCUMENTS

| | | |
|---|---|---|
| 1115627 | 10/1961 | Fed. Rep. of Germany . |
| 2123689 | 11/1972 | Fed. Rep. of Germany . |
| 2128974 | 12/1972 | Fed. Rep. of Germany . |
| 2449415 | 7/1975 | Fed. Rep. of Germany . |
| 1399891 | 7/1975 | United Kingdom . |
| 2129451 | 5/1984 | United Kingdom . |

*Primary Examiner*—Stanley N. Gilreath
*Attorney, Agent, or Firm*—Bell, Seltzer, Park & Gibson

[57] ABSTRACT

An apparatus is disclosed for transporting empty yarn winding tubes from a tube supply magazine, and then loading the tubes onto the transport mandrel of a service carriage. A rake removes the empty tubes in layers from a cardboard carton and delivers the tubes in a predetermined orientation to a channeled tube receiving tray, and the tubes are then individually dispensed from the tray and moved coaxially onto the transport mandrel of a service carriage.

13 Claims, 8 Drawing Sheets

APPARATUS FOR LOADING WINDING TUBES

BACKGROUND OF THE INVENTION

The invention relates to an apparatus for transporting empty winding tubes from a tube magazine and onto the transport mandrels of a transport carriage.

Apparatus of the described type are used to ensure a continuous winding operation in yarn spinning plants. To this end, it is necessary to continuously provide the winding takeup machines of these spinning plants with empty yarn winding tubes at the end of each winding cycle, since the yarns to be wound advance continuously to their respective winding positions.

In general, each winding spindle of a takeup machine is equipped with one or with several winding tubes, and one yarn advances to each of these winding tubes. The exchange of the full packages from each winding spindle for a corresponding number of empty tubes is performed fully automatically, so as to be able to wind within the shortest period of time the continuously advancing yarns on the empty tubes without an unnecessary waste of yarn.

DE-OS 29 39 675 and corresponding U.S. Pat. No. 4,340,187 disclose a package doffer for such a spinning plant, in which a yarn service carriage is provided for movement in the service aisle from one takeup machine to another. The yarn service carriage is operatively linked to a package doffing carriage. When in use at each contacted and serviced takeup machine, the full packages are removed from the winding spindle and transferred to the package doffing carriage which then delivers the packages to a package transport device. The package transport device receives a plurality of packages, which it subsequently transports to an individual control station. Thereafter, the full packages having been found satisfactory, advance to a packing station.

The doffing of the full packages and replacement with empty tubes are performed by a doffer. As used in the present application, a doffer is understood to be an apparatus traveling along the machine front from one takeup machine to another, which doffs the produced full packages at the end of a winding cycle. This doffing includes the removal of the full packages from each winding spindle, and the transfer of the full packages to a carriage for further transportation.

The time to doff the produced full packages is monitored by the doffer, it being useful that the doffer also requests the respectively needed number of empty tubes.

In one embodiment, the doffer is additionally designed to furnish the just serviced winding spindle with new empty tubes after removing and transferring the full packages, so that the takeup machine is able to continue its winding operation. Such a doffer is known, for example, from DE-AS 24 49 415. In the case of this doffer, the necessary number of needed empty tubes is continuously furnished by means of a conveyor chain passing by the doffer.

Also known from DE-OS 21 28 974 is a package doffing carriage which replaces full packages with empty tubes. In this embodiment, the empty tubes are carried along on the package doffing carriage and transferred to the winding spindle of the takeup machine by means of two gripping arms.

DE-OS 21 23 689 also discloses a traveling package doffer, which delivers the full packages to a traveling package transport device. Subsequently, the package transport device is moved to an individual control station, where the individual packages are subjected either individually or randomly to a quality check, and then continue to a packing station.

In light of this prior art, it is the object of the present invention to improve the apparatus for loading empty winding tubes such that it is possible to fully automatically introduce the tubes into an operation for processing continuously advancing yarns, in particular, synthetic filament yarns. A further object resulting therefrom is to improve the apparatus such that it can be used in a spinning installation for an uninterrupted production of a plurality of synthetic filament yarns.

SUMMARY OF THE INVENTION

The above and other objects and advantages of the present invention are achieved in the embodiments illustrated herein by the provision of an apparatus for transporting empty yarn winding tubes from a tube magazine wherein the tubes are supported in vertically stacked horizontal rows of tubes, and onto one or more transport mandrels of a transport carriage system. The apparatus comprises a horizontally disposed tube receiving tray having a plurality of parallel channels formed therein, with the channels being positioned laterally adjacent to each other so as to define a predetermined gauge, and with at least one of the channels defining a tube dispensing position. A tube transport rake is provided which comprises a horizontal bar and a plurality of tines extending perpendicularly from the bar and in a horizontal direction, and with the tines being laterally spaced apart so as to have a gauge which closely corresponds to the predetermined gauge of the channels. The rake is mounted for movement in a vertical direction and in a horizontal direction corresponding to the direction of the tines, and such that the rake can be moved horizontally into the uppermost row of tubes in the magazine with the tines entering respective ones of the tubes, and then moved vertically so that the tubes may be deposited in respective channels of the tray. Tube dispensing means is mounted to the tray for longitudinally dispensing the tubes located at the tube dispensing position coaxially onto at least one transport mandrel or the like, and tube shifting means is also mounted to the tray for laterally shifting the remaining tubes on the tray toward the tube dispensing position and so that at least one tube is shifted to the tube dispensing position and the tube dispensing means can then dispense the at least one shifted tube onto at least one additional transport mandrel.

The invention as described above provides the advantage that a large number of winding tubes corresponding to the number of tines of the rake can be simultaneously removed from the tube magazine, with the winding tubes being subsequently singled to meet the demand of a winding spindle.

Thus, the invention creates the necessary connecting link between a space-saving storage of empty tubes in the empty tube magazine and the demand for singled empty tubes of a winding spindle.

In the magazine, the empty tubes are stacked closely side by side in vertically stacked, horizontal rows of tubes, so that the rake with its tines is able to move into the uppermost row and to remove this row of tubes from the magazine. As a result, it is accomplished with certainty that the empty tubes stacked in rows are introduced exactly by rows onto the tray.

Thereafter, the just removed, uppermost row of empty tubes is singled. This singling occurs on the tray by the cooperation of the tube dispensing mechanism and the tube shifting mechanism. In this regard, it is significant that the channeled tube receiving tray has a gauge which corresponds substantially to the tube diameter, and that the tines of the rake have a corresponding gauge. This feature is utilized by the present invention to single the layer of empty tubes which is placed on the channeled tray. Also, this ensures that all empty tubes lie in clear positions on the channeled tray, with each empty tube being associated with a single receiving position.

In operation, the winding tubes which are in the dispensing position are pushed in the longitudinal direction onto the transport mandrel which has been moved to a position in alignment with the dispensing position. To this end, the transport carriage may be adapted for manual or automatic or respectively fully automatic positioning in the dispensing position.

In a preferred embodiment, the individually movable transport carriages travel independently of each other and form a transport system which is always available for servicing winding heads. From this, a flexible servicing is achieved in accordance with the respective needs of individual winding spindles of the takeup machines, which entails the shortest waiting time for the removal of the full packages at the end of a winding cycle. Consequently, is it possible to achieve a high degree of utilization of the takeup machines as a whole.

In a preferred embodiment, the tube dispensing mechanism engages the front end of the tubes at the dispensing position, and displaces these tubes along their longitudinal direction. This provides the advantage of a simple linear drive for the mechanism and a troublefree transmission. Such a dispensing mechanism may be realized with simple means, for example, by a pneumatic piston-cylinder unit.

The channels of the tube receiving tray are preferably disposed parallel to each other, with each channel defining a single tube receiving position. This offers the advantage that the deposited winding tubes are freely accessible from all sides and, in particular, that the dispensing of the winding tubes onto the transport mandrel is enabled free of impediments. It should however be noted that the channeled tube receiving tray need not be limited to this design. For example, it may also consist of a stationary rake.

The above construction has the further advantage that the channeled tube receiving tray can be loaded from one side and be unloaded from the opposite side. This pass-through method requires only a very simple kinematic guidance of the rake and the dispensing device.

In one embodiment, a transfer tray is positioned in alignment with the tube dispensing position of the tray, and the dispensing mechanism is adapted for stepwise movement either by the length of the channeled tray, or by the length of the channeled tray and the length of the transfer tray. This feature offers the advantage that in time it is possible to assemble first the necessary number of empty tubes for a winding spindle before loading the mandrel of the transport carriage, so as to then be able to push these empty tubes concurrently onto the transport mandrel. This accomplishes that the apparatus of the present invention can easily be adapted to the requirements of producing respectively different numbers of packages per winding spindle.

In one embodiment, the length of the channeled tray corresponds to the length of the winding tubes, and the length of the transfer tray is substantially an integral multiple of the length of the tray. This has the advantage that the channeled tube receiving tray and the transfer tray occupy in the longitudinal direction of the winding tubes the smallest possible length, thereby ensuring simultaneously a reliable placement of the winding tubes.

It is preferable to mount the tube transport rake so that it can be rotated about the horizontal axis of the bar, and so that the tines can be moved to a vertically upward orientation. This ensures that the loaded rake will not lose the winding tubes inserted on its tines even upon a rapid traverse and braking in horizontal direction.

The dispensing position is preferably one of the end channels along one side edge of the tray, and the shifting mechanism moves from the other side edge of the tray toward the dispensing position. This makes it possible that an adequate number of empty tubes always lies on the channeled receiving tray, and the winding operation can be continued, even when it is necessary to refill the tube magazine.

The tube magazine preferably comprises a receptacle adapted to receive an open box like container, such as a cardboard carton, therein. The cardboard carton has an open vertical side facing the tube transport rake, and the lateral width of the carton is an integral multiple of the diameter of the tubes positioned in the carton. By this construction, the winding tubes in the tube magazine are stacked on top of one another in fully identical rows, so that the rake is able to move in the same position into the uppermost row of empty tubes. These features result in the superposed winding tubes, despite their unstable position of equilibrium, being reliably held in their position, since the outer-most winding tubes are able to support themselves on the walls of the carton.

Also, the cardboard shipping carton of the manufacturer of winding tubes can simultaneously be used as the tube magazine. This double function leads consequently to a troublefree introduction of the supplied winding tubes into the processing of the yarn.

The channeled tube receiving tray may be a rigid structure wherein the channels are fixedly positioned with respect to each other, or the tray may comprise separate elements, with each element defining one of the channels. Also, in this latter embodiment, the elements are mounted in an endless arrangement defining an upper run and a lower run, and the tube shifting mechanism comprises a drive for laterally moving the elements, such that each of the elements may be moved to the dispensing position. To this end a drive mechanism may be used which is adapted for stepwise movement by the channel gauge in a direction toward the dispensing position.

The drive of the shifting mechanism may be driven either stepwise or continuously, in the latter case it being necessary to adapt the circumferential speed to the timing of the package doff.

Where the tray is a rigid structure, only a small number of parts is movable. In this embodiment, the entire layer of tubes is laterally shifted in the parallel channels of the tube receiving tray, in a direction toward the dispensing position. The path of displacement amounts respectively to one channel gauge, in addition to the path of displacement of the preceding displacement cycle. This continues until the entire layer of tubes is inserted on the mandrels of the transport carriages. Subsequently, the rake supplies a new layer of tubes.

The tube dispensing mechanism preferably engages the front end of the winding tubes, i.e. the end opposite the transport mandrel. This enables a slipfree engagement of the winding tubes in the dispensing position, and which is to the greatest possible extent, independent of the different diameters of winding tubes from different manufacturers and suppliers or for different products.

The transporting apparatus of the present invention is particularly adapted for use as part of a textile yarn processing plant, which enables a fully automatic production process of a plurality of continuously advancing synthetic filament yarns in a twenty-four hour cycle.

BRIEF DESCRIPTION OF THE DRAWINGS

Some of the objects and advantages of the present invention having been stated, other will appear as the description proceeds when taken in conjunction with the accompanying drawings in which.

DETAILED DESCRIPTION OF THE PREFERRED EMBODIMENTS

Figure 1:
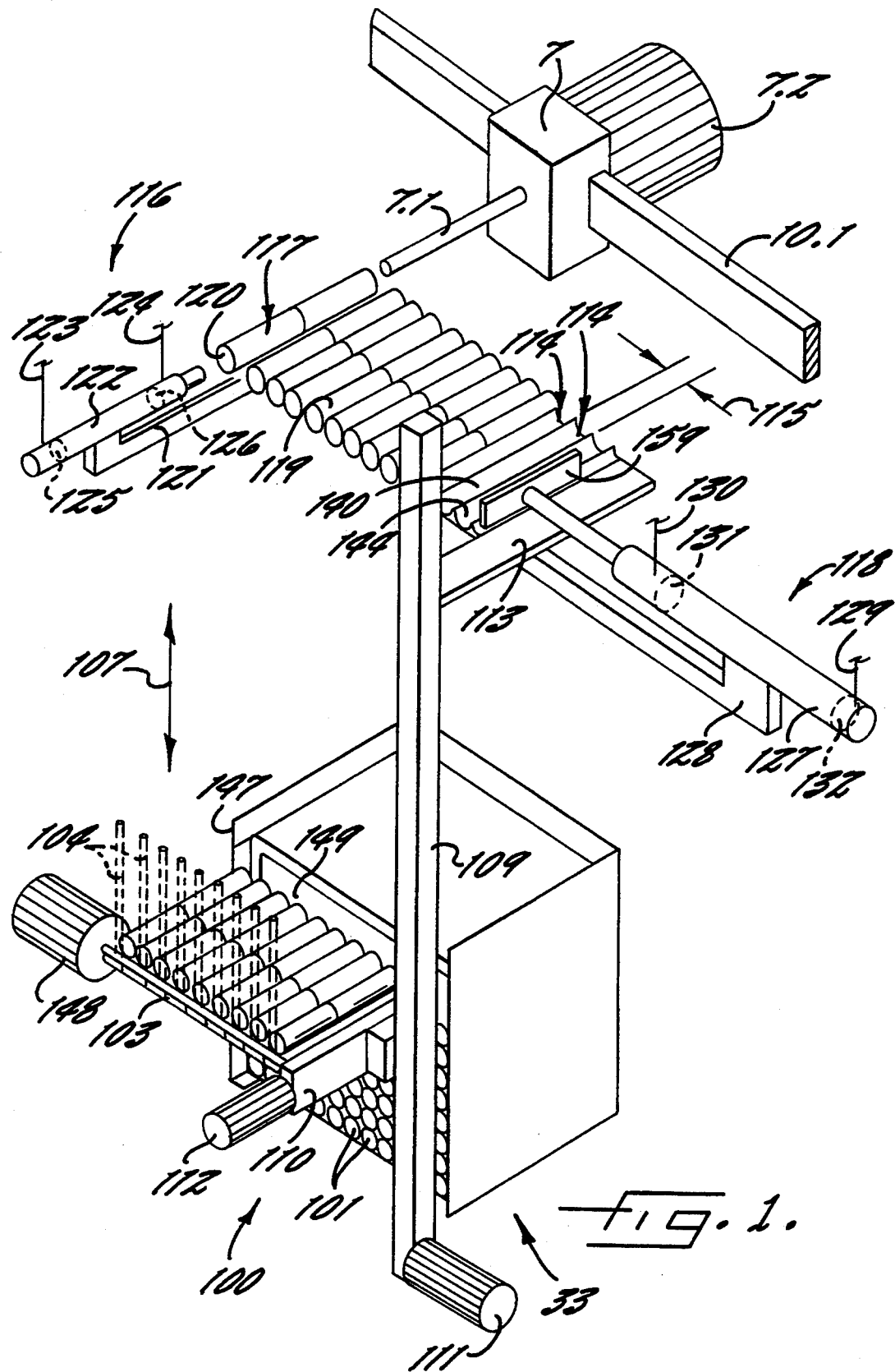
FIG. 1 is a fragmentary perspective view of one preferred embodiment of the present invention.

FIGS. 1-7 show an apparatus 100 for loading winding tubes 101 from an empty tube magazine 33 onto a transport mandrel 7.1 of a carriage 7, and which embodies the present invention.

Figure 2:
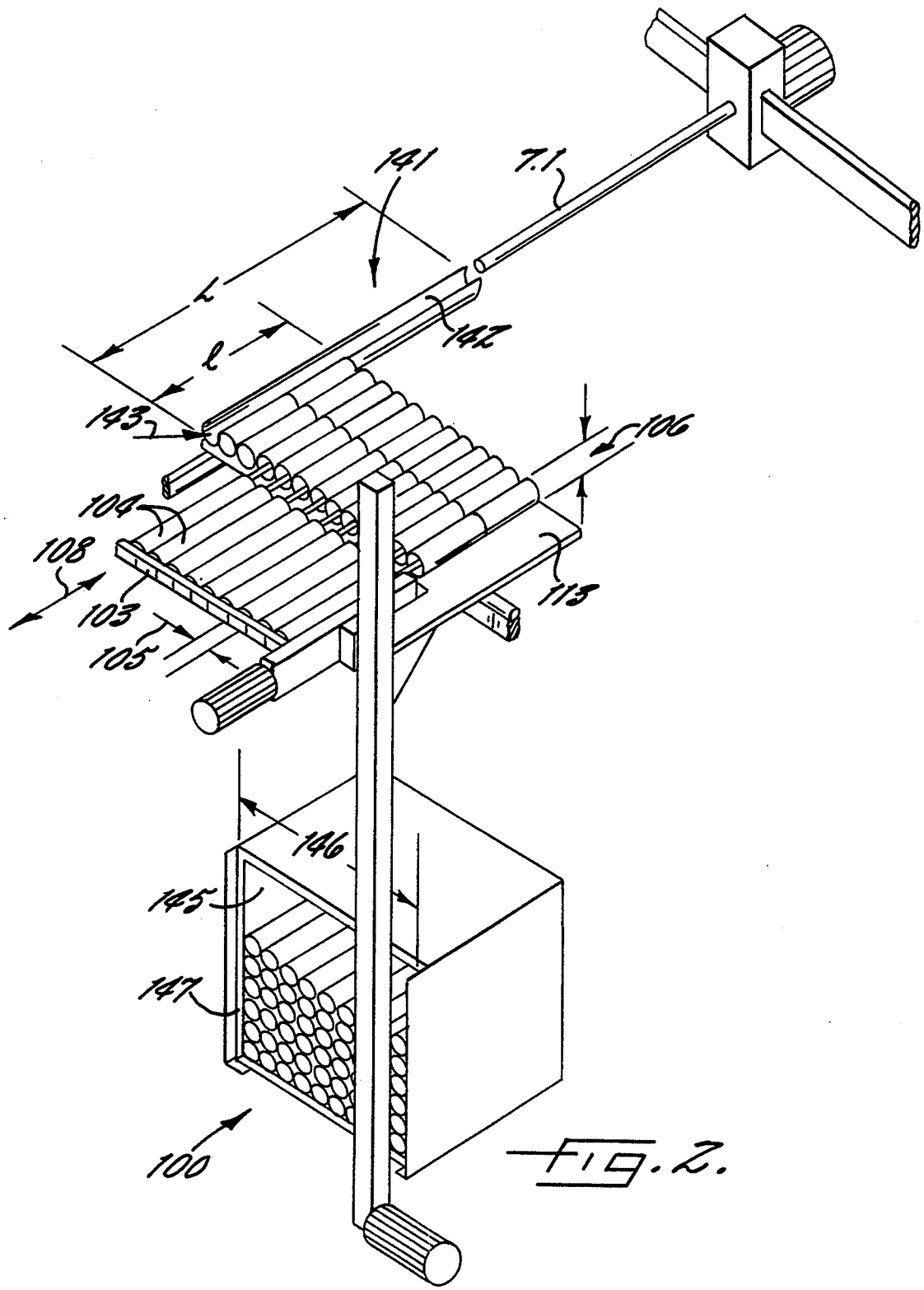
FIG. 2 is a fragmentary perspective view of another embodiment of the invention, and which includes a transfer tray.

As is shown in particular in FIGS. 1 and 2, this apparatus comprises a rake 103 which comprises a horizontal bar and a plurality of tines 104 extending perpendicularly from the bar and in a horizontal direction as seen in solid lines in FIG. 1. The tines 104 have a gauge 105 (FIG. 2) which corresponds substantially to the diameter 106, of the winding tubes 101.

FIG. 1 shows the rake 103 in a position shortly after it has removed the uppermost row of tubes from the empty tube magazine 33, whereas FIG. 2 shows the rake in its upper position, shortly after it has deposited the previously removed row of tubes on the channeled tray 113. This function will be explained below in more detail.

However, as can be noted already from the foregoing description, the rake 103 is adapted for movement both in a vertical direction 107 and in the horizontal direction 108 of the tines 104.

To this end, the rake is rigidly mounted on a platform 110, which can be raised and lowered in the vertical direction in the fashion of an elevator along a stationary upright 109. This is accomplished, for example, by a threaded spindle (not shown) which is rotatably supported inside the upright 109, and driven in both directions by a vertical drive motor 111. A different vertical drive may be utilized, such as hydraulic cylinders.

The platform 110 is provided with a horizontal guideway which is not shown in detail. The rake is adapted to travel forward and back along this guideway by means of a horizontal drive motor 112 in the direction 108 of its tines 104.

The channeled tube receiving tray 113 is rigidly mounted on the stationary upright 109, so that the tray remains always in the illustrated position.

The channeled tray 113 can be loaded with the empty tubes 101, by movement of the rake 103 in the direction 108 toward the channeled tray. To this end, the channeled tray 113 forms a plurality of receiving positions 114, whose number should however be at least as large as the number of tines 104 of the rake 103, so as to obtain for each of the empty tubes 101 a clearly associated receiving position 114 on the channeled tray 113.

The receiving positions extend in a horizontal plane, and their gauge corresponds to the tube diameter 106.

Furthermore, the loading apparatus 100 includes a dispensing mechanism 116 which engages the tubes in one of the receiving positions and pushes the engaged tube in its longitudinal direction along the channel and coaxially onto the transport mandrel 7.1.

The associated receiving position on the channeled tray is referred to as the dispensing position 117, and in the present embodiment it is the terminal receiving position 143. However, this is not a limitation to the invention, since in principle each of the receiving positions 114 can be a dispensing position 117.

Furthermore, the loading apparatus 100 includes a tube shifting mechanism 118 which is mounted to the channeled tube receiving tray 113. After the winding tube 101 is moved from dispensing position 117 onto transport mandrel 7.1 by the dispensing mechanism 116, the layer 119 of tubes placed on channeled tray 113 is laterally shifted by the mechanism 118 a distance equaling one channel gauge 115 in the direction toward the dispensing position 117.

The dispensing mechanism 116 and the shifting mechanism 118 are in principle constructed in the same manner so that the same description applies to both.

The dispensing mechanism 116 and the shifting mechanism 118 are double-acting piston-cylinder units 122, 127 which are fixedly mounted with respect to the channeled tray on supports 121, 128. Each of the moved-out pistons of the piston-cylinder units 122, 127 is associated to the channeled tray, with the piston-cylinder units 122, 127 being aligned perpendicularly to one another. Each of the piston-cylinder units 122, 127 is connected to both an advance line 123, 129 and a retraction line 124, 130.

A biasing of the advance lines 123, 129 causes the associated piston-cylinder unit 122, 127 to move respectively to its advanced position 126, 131. In like manner, as a result of biasing the retraction lines 124, 130, the associated piston-cylinder unit 122, 127 is moved to its retracted position 125, 132.

In FIG. 2, the double-acting piston cylinder units 122, 127 are not shown for the sake of simplicity. However, it should be noted that they are included in this embodiment.

A special feature of the illustrated embodiments is that the dispensing mechanism 116 engages the winding tubes 101 in the dispensing position 117 on their front side and displaces the tubes parallel to their longitudinal direction. For this reason, the piston-cylinder unit 122 is arranged coaxially in front of the dispensing position 117, and it moves toward the tubes in their longitudinal direction.

It is a further characteristic of the embodiments of FIGS. 1 and 2 that the tube receiving tray 113 consists of channels 140 parallel to one another, with each channel forming a receiving position 114. The channels 140 are arranged closely adjacent to one another and impart to the deposited layer of tubes 119 the necessary lateral support so that they are unable to roll off.

FIG. 2 shows a further characteristic. In this embodiment, a transfer tray 141 is arranged in front of and in alignment with the dispensing position 117 of the channeled tube receiving tray 113. Furthermore, the dispensing mechanism which is not shown in this Figure, but corresponds to that illustrated in FIG. 1, is adapted for a step-by-step displacement either by the length l of channeled 113 or additionally by the length (L-1) of the transfer tray 141.

Accordingly, the piston-cylinder unit 122 should be dimensioned such that it is movable as a whole by the length L. However, the dispensing unit can be moved by this length L only at every second dispensing cycle, as will be explained further below.

In the present case, the length l of the receiving tray 113 corresponds substantially to the length of the winding tubes, with the illustration showing the further characteristic that the length l of the channeled tube receiving tray corresponds to twice the length of a winding tube. What matters is that the length l of the channeled receiving tray 113 corresponds to the single length of a winding tube 101 or an integral multiple thereof.

Once this length l is predetermined, the length (L-1) of transfer tray 141 is dimensioned such that it is essentially an integral multiple of the length l of channeled tube receiving tray 113. In the present illustration, the length L-1 of transfer tray 141 is one time the length l of channeled tube receiving tray 113.

The transfer tray 141 is preferably constructed similarly to the construction of the channeled tray 113 as a storage channel 142, along which the winding tubes 101 in dispensing position 117 are moved.

FIG. 1 shows in dashed lines a further feature of the invention, in that the rake 103 is supported on the platform 110 for rotation about the longitudinal axis of the horizontal bar by means of a pivot drive 148 such that its tines 104 can be rotated to a vertically upward directed position as shown in dashed lines.

As is further shown in FIGS. 1–7, the dispensing position 117 is one of the end receiving positions 143, and the shifting mechanism 118 (see FIG. 1) is adapted for movement such that it moves from the receiving position 144 at the other side of the channeled tray 113 toward the dispensing position 117.

The empty tube magazine 33, as shown in FIGS. 1 and 2, defines a parallelepipedal storage space 145. This storage space is open in its vertical plane facing the rake 103. In this vertical plane, the front ends of the winding tubes 101 are arranged so that the latter face with their opening the tines 104 of the rake 103.

The horizontal inside width 146 of the magazine 33 corresponds to one tube diameter 106 multiplied by the number of winding tubes 101 in one row or layer.

In the present case, the empty tube magazine is a cardboard box 149 which is open on one side and sits in a stationary cardboard box receptacle 147. It is supported on all sides by the receptacle 147 and prevented from slipping, when the rake moves in and out with its tines. The supporting effect on all sides accomplishes that the winding tubes 101 remain in the cardboard box 149 always in a receptive position for the rake 103.

Figure 3:
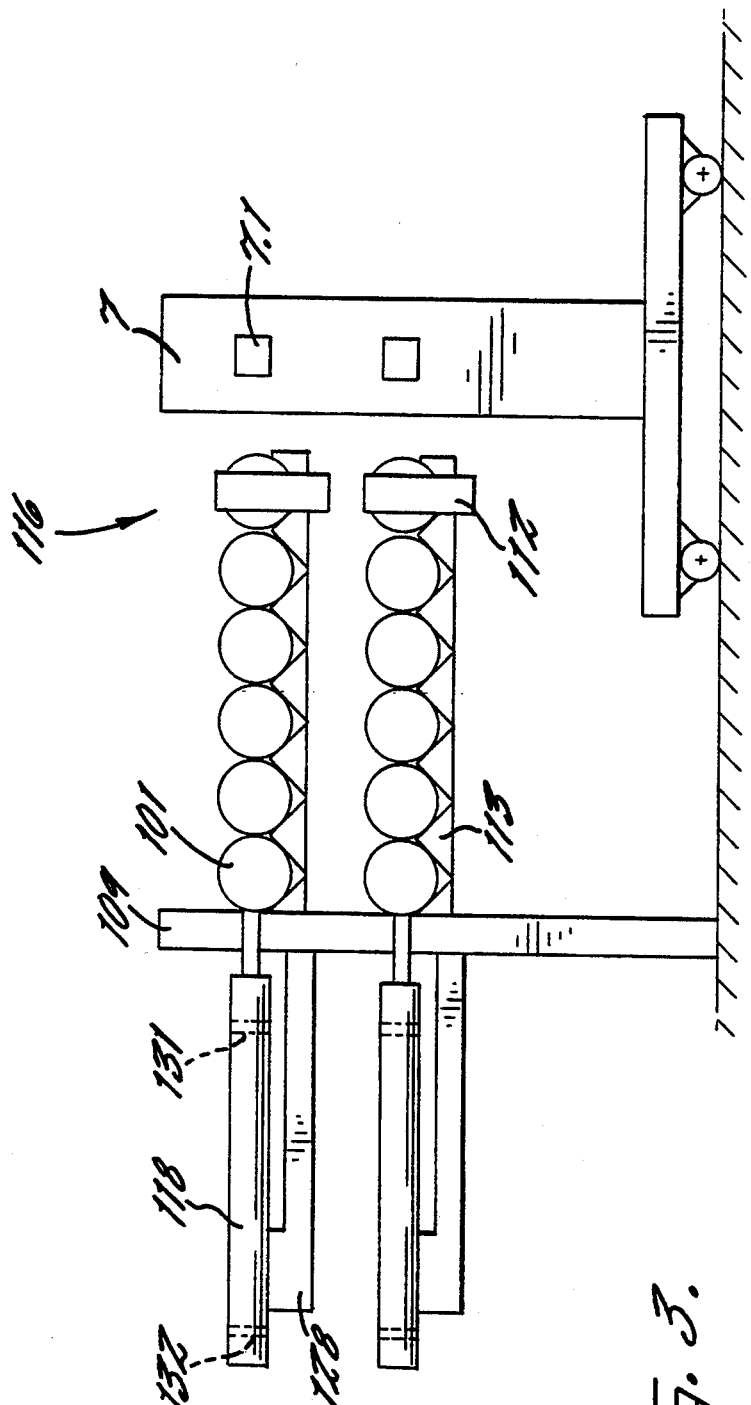
FIG. 3 illustrates an embodiment of the invention which includes several, vertically superposed channeled tube receiving trays.

FIG. 3 illustrates a servicing or transport carriage 7 having several vertically superposed transport mandrels 7.1, two being shown in the illustrated embodiment. Associated thereto are two channeled tube receiving trays 113 which extend respectively in the planes of the transport mandrels 7.1. Associated with each channeled tube receiving tray 113 is a dispensing mechanism 116 as well as a shifting mechanism 118.

Figure 4:
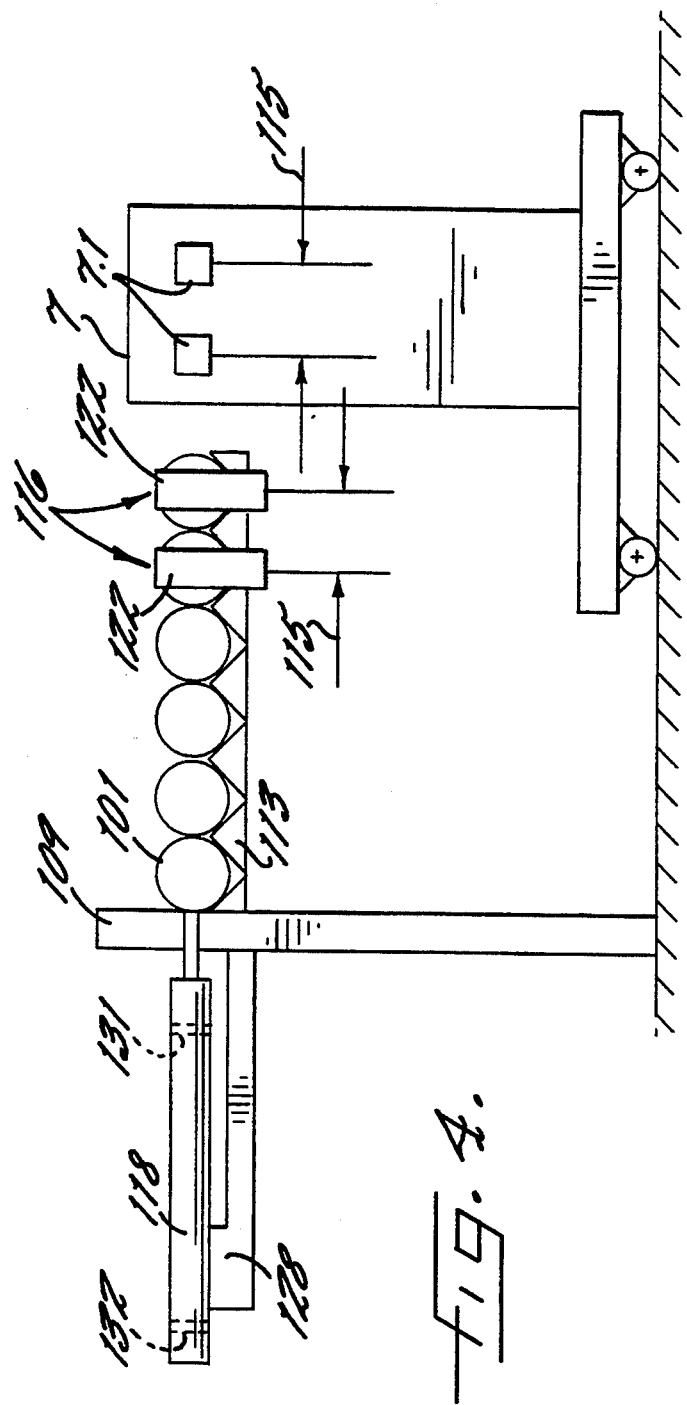
FIG. 4 illustrates an embodiment of the invention wherein the channeled tray has several, horizontally juxtaposed dispensing positions.

FIG. 4 shows a servicing carriage 7 with two transport mandrels 7.1 arranged side by side in a horizontal plane. For a simultaneous loading of these transport mandrels 7.1, the channeled tube receiving tray 113 has two dispensing positions 117, of which each has its separate dispensing mechanism 116 which is here constructed as a piston-cylinder unit 122.

What matters here is that the channel gauge 115 also corresponds to the horizontal gauge of the transport mandrels 7.1, so that both transport mandrels can be loaded in a single loading position of the transport carriage 7 without having to reposition the latter.

Figure 5:
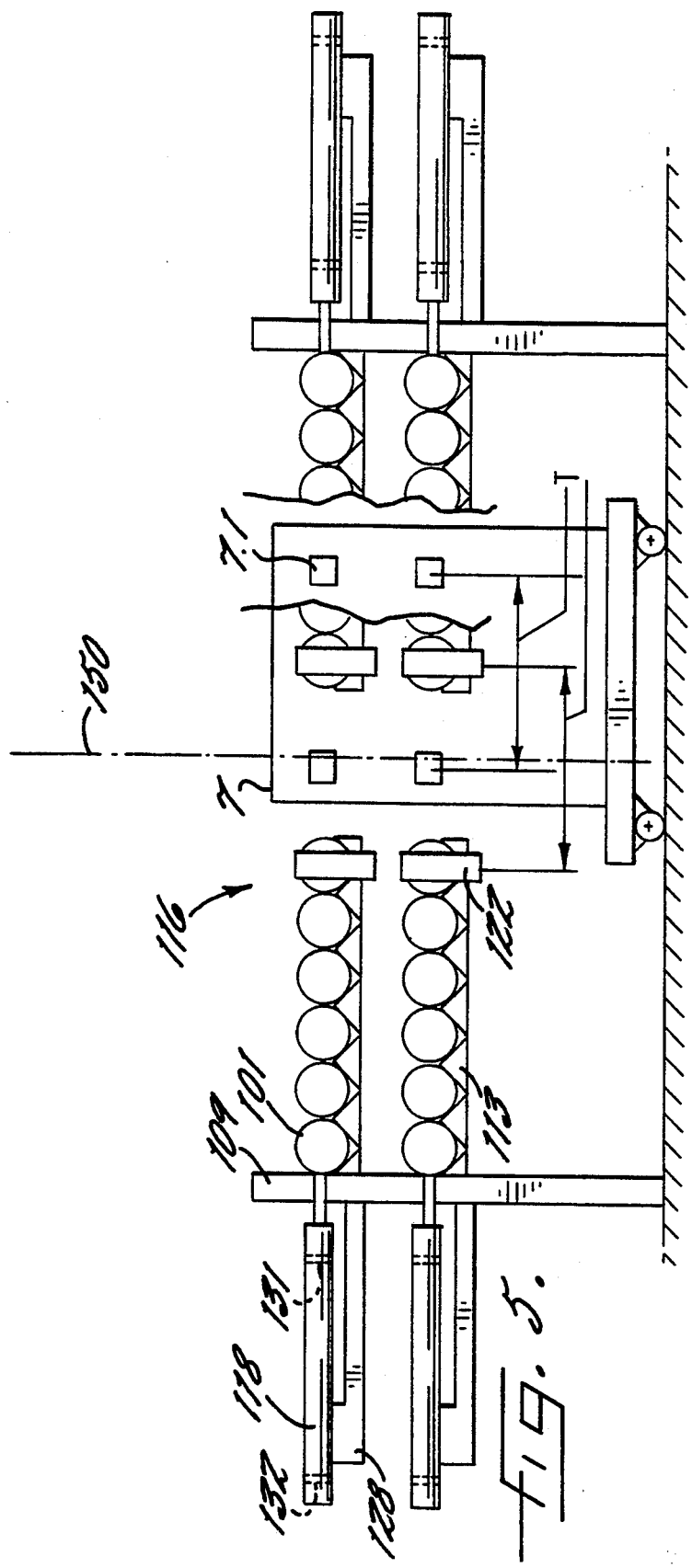
FIG. 5 illustrates an embodiment of the invention having symmetrical channeled tube receiving trays and several dispensing positions.

FIG. 5 illustrates a servicing carriage 7 having a total of four transport mandrels 7.1 arranged in a rectangular pattern. Two opposing pairs of channeled tube receiving trays 113 are positioned to define a central plane 150 therebetween, with the dispensing positions 117 facing one another across this central plane 150. The dispensing positions 117 and the transport mandrels 7.1 are spaced from one another respectively by the distances T of the transport gauge, as will be described with reference to FIG. 8.

Figure 6:
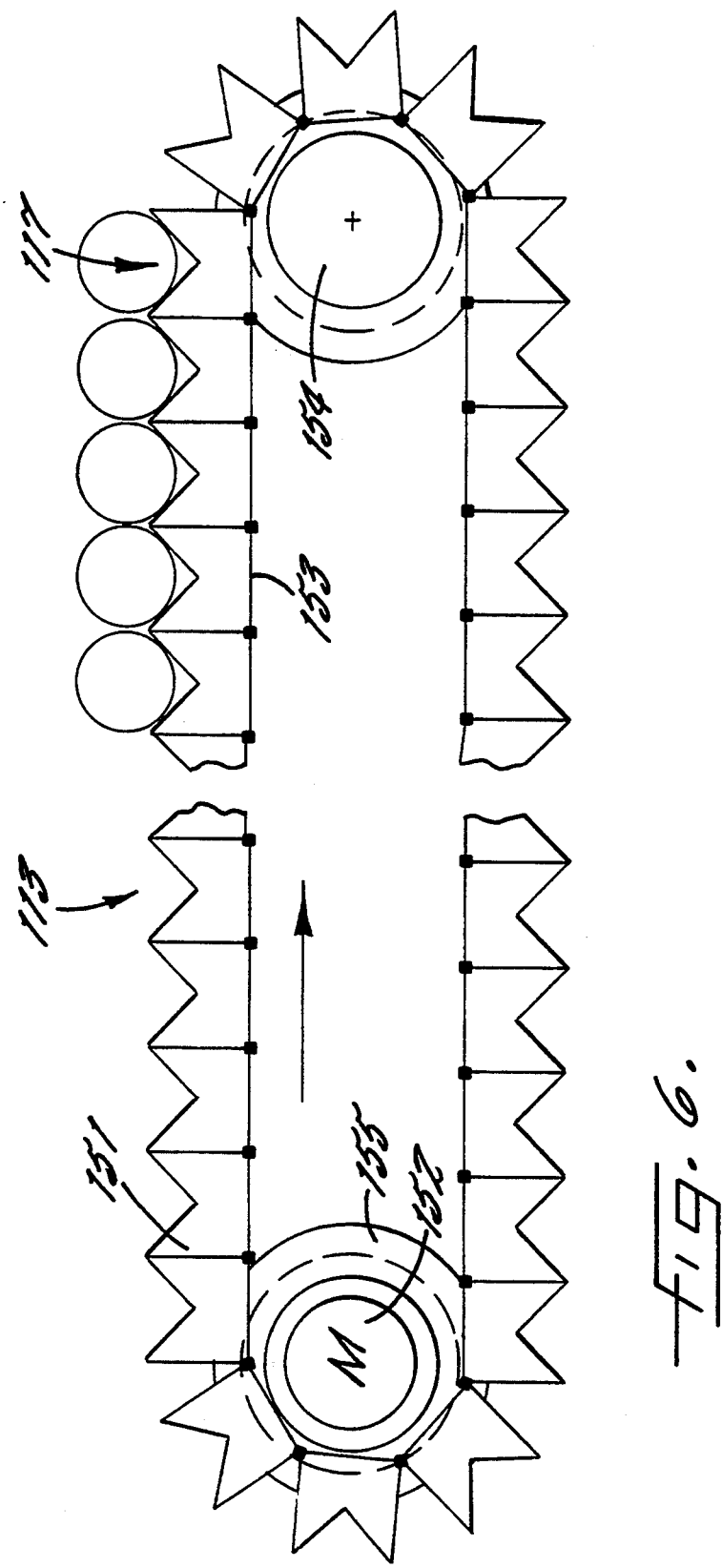
FIG. 6 illustrates an embodiment of the invention wherein the tray is composed of movable tube receiving elements.

FIG. 6 shows a channeled tube receiving tray 113 which comprises a plurality of separate receiving elements 151 which are mounted to form an endless conveyor chain 153 entrained about sprockets 154, 155 and defining an upper run and a lower run. The upper run is movable transversely to the longitudinal tube axis in a direction toward the dispensing position 117. The drive means for effecting this movement comprises a drive motor 152. The drive may be continuous or stepwise.

Figure 7:
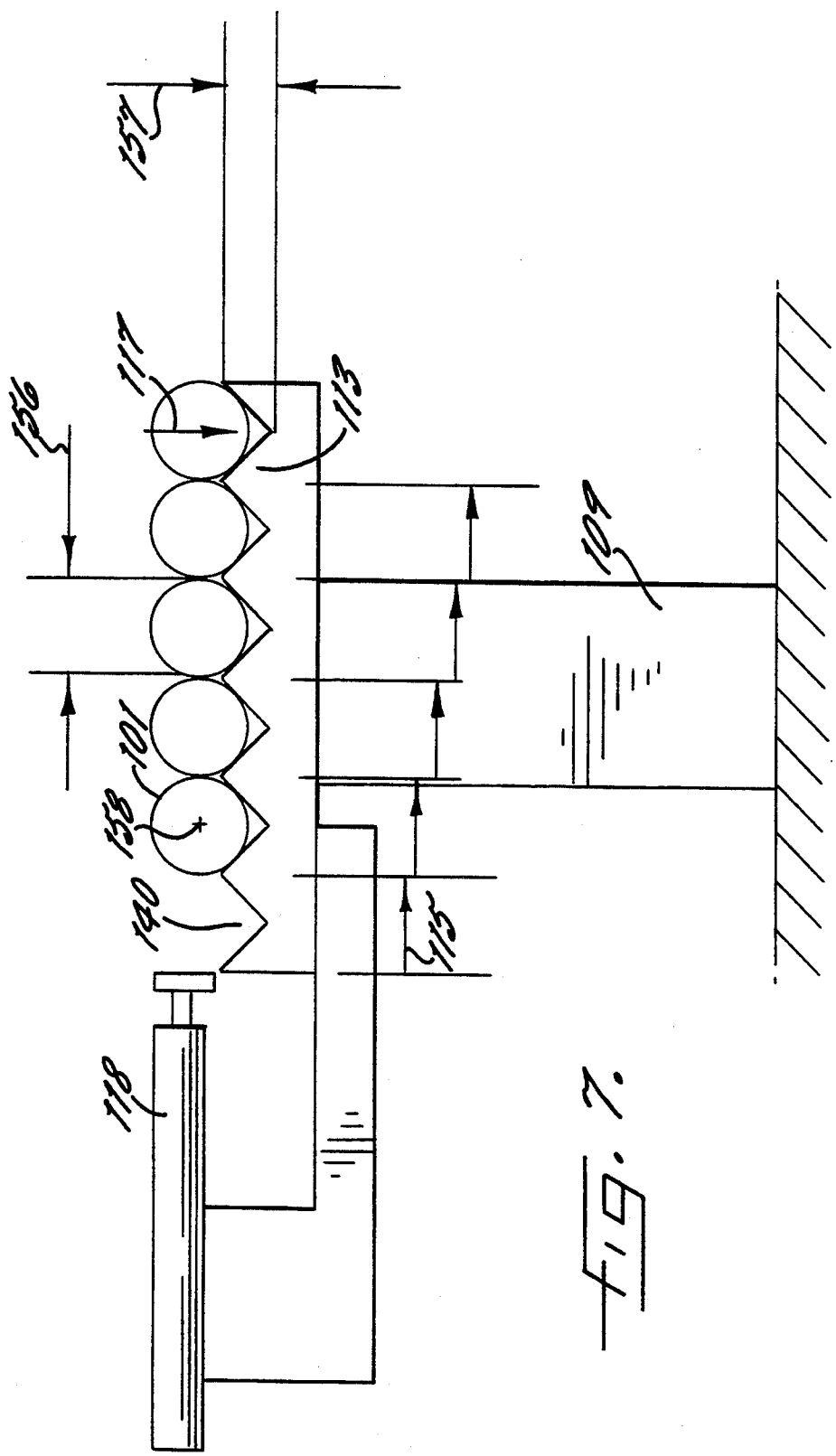
FIG. 7 illustrates an embodiment of the invention wherein the tube receiving tray is composed of fixed channels.

FIG. 7 is a detail view of the tube receiving tray 113 and channels 140 of FIGS. 1 and 2. The channels 140 are stationarily arranged on the likewise stationary tube receiving tray 113. The depth 157 of each channel is clearly smaller than the outside diameter 156 of the winding tube 101 received therein, but at least sufficiently deep so that each of the winding tubes 101 rests securely balanced in its channel 140.

The shifting mechanism 118 is adapted to move perpendicularly to the longitudinal tube axis 158 in steps equaling the channel gauge 115 and in a direction toward the dispensing position 117.

In all cases, the dispensing mechanism 116 engages the front end 120 of the winding tubes 101 which face away from the transport mandrel 7.1.

In operation, the individually movable transport carriages 7 with an empty mandrel 7.1 travel past the dispensing position 117, and wait in this travel position, in which the mandrel 7.1 is aligned in front of the dispensing position.

Located in the dispensing position 117 are as many winding tubes 101 as the waiting transport mandrel 7.1 is able to receive. In the embodiment of FIG. 1, these are two winding tubes 101, and in the embodiment of FIG. 2, these are four winding tubes 101.

Then, the piston cylinder unit 122 of the dispensing mechanism 116, which is in its retracted position 125, moves in a direction toward the transport mandrel 7.1. In so doing, the piston, as it moves out, contacts the aligned tubes in the dispensing position 117 at their front end 120, and pushes them ahead of it, as it moves out further. The piston continues to move out until it reaches the end of channeled tray 113, and thus inserts on the transport mandrel 7.1 the aligned tubes which it has pushed in front of it.

The transport carriage 7, now loaded with winding tubes 101, removes itself as will be described in more detail with reference to FIG. 8.

The dispensing mechanism 116 still being in its advanced position returns to its retracted position 125, and thus leaves an empty dispensing position 117 which must be filled. To this end, the piston-cylinder unit 127 of the shifting mechanism 118 moves from its retracted position 132 toward the next row of tubes, and advances them by one channel gauge 115. In so doing, a shield 159 arranged at the free end of the piston pushes the entire layer of tubes, so that the dispensing position 117 is refilled.

The piston-cylinder unit can now stay in this position until the next operating cycle, or return to its illustrated initial position. The first of the two possibilities has the advantage that the working paths are as short as possible, and that it is not necessary to accept idle paths. The second of the two possibilities offers the advantage of a simpler control, since the shifting mechanism must clear the path when it becomes necessary to supply a new layer of tubes.

In the present embodiment, the rake 103 has nine tines 104, whereas the channeled tray 113 is able to receive thirteen rows of tubes. Thus, proceeding from a fully occupied tray 113, and the above operation having been repeated nine times, it is possible to remove a new layer of tubes from the empty tube magazine 33 and place the tubes on the channeled tray 113.

To this end, the rake 103 moves with its tines 104 into the uppermost layer of the empty tube magazine 33, raises somewhat, and then returns to the position shown in FIG. 1. If need be, it may now be rotated to the vertical position shown in dashed lines. Then, the removed layer of tubes is moved vertically upward in direction 107 far enough that the rake 103 is somewhat above the channeled tray 113. It is necessary that the rake stay sufficiently elevated during the subsequent horizontal movement in direction 108, so that it is able to place the supplied empty tubes 101 from above into the receiving positions 114 provided therefor.

In so doing, each tine 104 of rake 103 is associated precisely to one channel receiving position 114, so that each tine 104 is aligned in the center above its associated channel 140.

After the rake 103 is lowered sufficiently far that the winding tubes 101 lie in their channels 140 in circumferential engagement therewith, and the inner circumference of each winding tube 101 no longer contacts its associated tine 104, the rake 103 is moved in horizontal direction 108 to the position illustrated in FIG. 2, and it can then return to its loading position at the empty tube magazine 33.

These operations repeat themselves continuously, and therefore can easily be integrated into the operation of a spinning installation described below with reference to FIG. 8.

Figure 8:
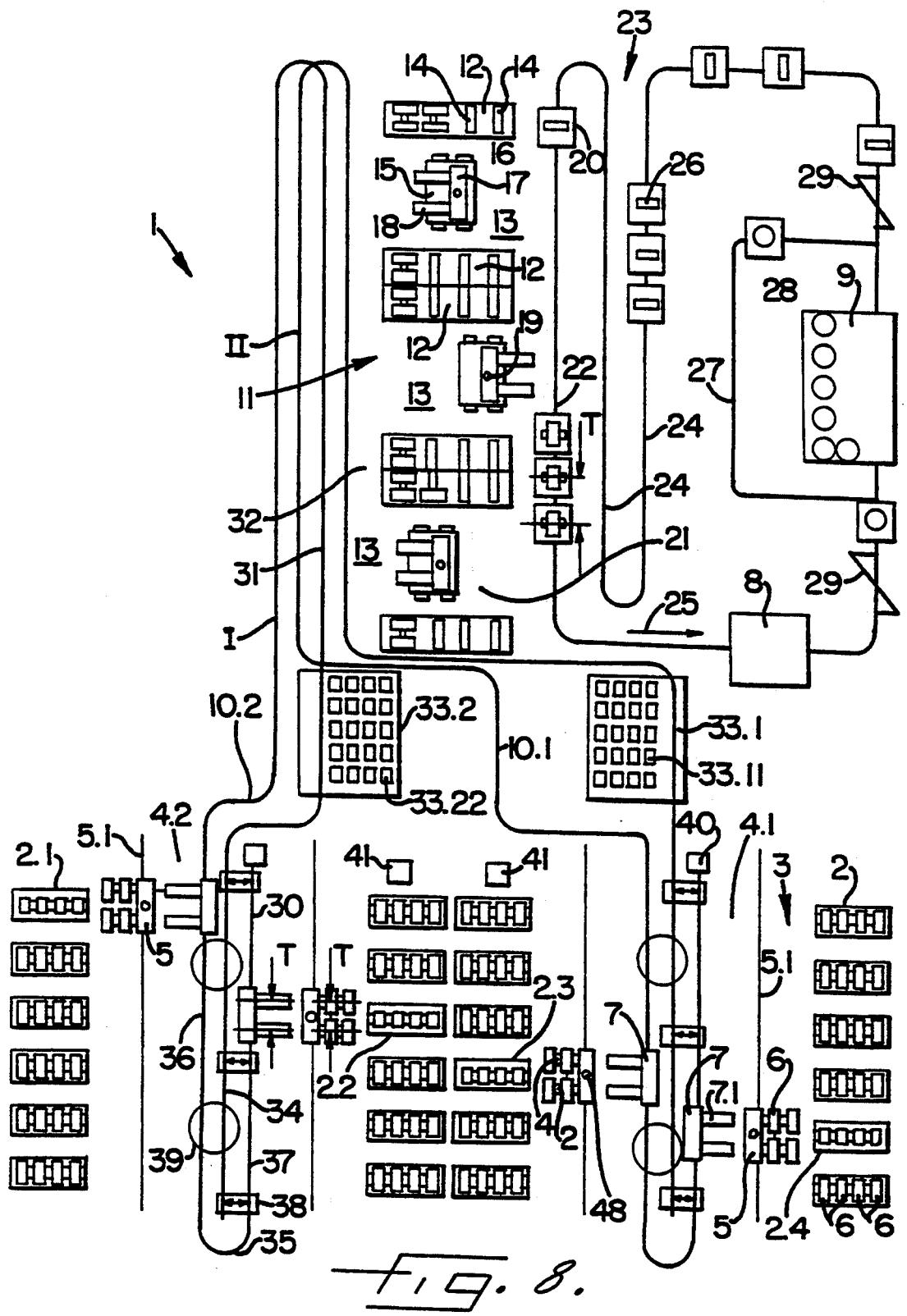
FIG. 8 is a schematic top plan view of an arrangement of the invention in association with a spinning plant.

Referring now to FIG. 8, a spinning installation i for the continuous production of a plurality of synthetic filament yarns is illustrated which comprises a plurality of takeup machines 2, which are arranged in columns 3 along a service aisle 4.1, 4.2. Illustrated are two service aisles 4.1, 4.2 which are aligned parallel to one another. On each side of each of the service aisles, a column 3 of takeup machines is arranged parallel to the service aisle 4.1, 4.2, with the winding spindles of the individual takeup machines extending perpendicularly into the service aisle.

In each of the service aisles, a doffer 5 is arranged for movement along a path 5.1 such that the doffer 5 is able to travel along the path 5.1 from takeup machine to takeup machine. In the present embodiment, a separate doffer 5 is associated with each column of takeup machines. However, it should be noted that it is also possible to provide in each service aisle only one doffer for movement along a path which extends along both columns of takeup machines.

At each contacted and serviced takeup machine 2.1, 2.2, 2.3, 2.4, the doffer 5 receives full packages 6 from the winding spindles and delivers the packages to a transport carriage 7 which is, for this purpose, in a standby position at each contacted and serviced takeup machine 2.1, 2.2, 2.3, 2.4, to receive the full packages. The transfer of the full packages to the transport carriage occurs by means of a mandrel 7.1, as will be described in more detail below.

Associated with each of the service aisles 4.1, 4.2 is a conveyor track 10.1, 10.2. A plurality of individually movable transport carriages 7 travel along each of the conveyor tracks, each individual transport carriage having its separate drive and being adapted to stop independently of the other transport carriages.

The conveyor tracks extend between the front ends of the columns of takeup machines and a temporary storage 11 such that the transport carriages can be moved forward and back unobstructed along this path. To this end, each of the individual conveyor tracks forms a closed loop, and has a forward track 30 from the service aisle 4.1, 4.2 to the temporary storage 11, and a return track 31 in the opposite direction, with a closed loop positioned in each service aisle 4.1, 4.2, and from there up to one of the front sides 32 of aisle 13 of the temporary storage 11.

In the present application, a forward track is described as that path which is covered by the transport carriages loaded with the full packages pertaining to one winding spindle until the delivery of the full packages to the temporary storage 11.

It will be noted that the return track 31 of each conveyor track 10.1, 10.2 passes by an empty tube magazine 33.1, 33.2, where the mandrels 7.1 of the transport carriages 7 receive the empty tubes 33.11, 33.22 required for a winding spindle.

A further characteristic is that the return track 31 of each of the closed-looped conveyor tracks 10.1, 10.2 leads to a closed cul-de-sac 34 along service aisle 4.1, 4.2. The forward track is laid in a U-shape in the service aisle, with a first branch 36 extending on one of the two sides of return track 31, and a second branch 37 terminating at the end of service aisle 4.1, 4.2, which is adjacent the temporary storage 11, and extending on the other side of return track 31. At the end opposite the temporary storage 11, the first branch 36 and the second branch 37 are interconnected by a reversing loop 35, and are further connected to the return track 31 by switches.

To this end, the return track 31 is connected with the first branch 36 of the forward track 30 via changeover switches 39 which transfer the transport carriages 7 advancing from the return track 31 onto the first branch 36 of forward track 30 while reversing the travel direction.

Further to this end, the return track 31 is connected with the second branch 37 of the forward track 30 via parallel switches which transfer the transport carriages 7 advancing from the return track 31 onto the second branch 37 while maintaining the travel direction.

When viewed in the travel direction of return track 31, a total of five switches are successively arranged, with changeover switches and parallel switches alternating with one another. Furthermore, changeover switches and parallel switches are arranged in close vicinity to one another.

Such an arrangement of switches ensures that each of the transport carriages 7 need not always travel along the entire U-shaped path, when it is necessary to service one of the takeup machines. Furthermore, it is ensured that each of the transport carriages on each possible path arrives at a doffer with its projecting mandrels facing the doffer in the correct receiving position.

The conveyor tracks associated to each of the service aisles are independent of each other, in that the conveyor tracks 10.1, 10.2 pass by the temporary storage at different conveying heights I, II. The conveying heights I, II are vertically spaced from one another such that the individual transport carriages of the two tracks do not contact one another.

After having passed through a control station 8 for the individual packages, the full packages received by the transport carriages are to be moved to a packing station 9.

Since the full packages are continuously produced on the takeup machines, all transport carriages are employed in a 24-hour operation, so as to transport the full packages from the takeup machines to the stationary temporary storage 11.

The temporary storage 11 comprises several high-rise creels 12 which are arranged parallel to one another, and each pair of which forms an aisle 13 therebetween. Each of the high-rise creels 12 is provided with a plurality of storage mandrels 14 which project into the aisle 13.

In each of the storage aisles, a servicing device 15 is provided for movement between both ends 21 and 32 of the aisle. Each servicing device 15 is provided with a bottom platform which is equipped with wheels 16 and carries an elevator 17 with a pair of transport mandrels 18. The latter serve to receive the full packages delivered by a transport carriage and to transfer the packages to storage mandrels 14 of one of the high-rise creels, as will be described in more detail below. In any event, it is preferred to provide the transport mandrels in pairs.

The transport mandrels 18 can be moved up and down by means of the elevator 17, with the elevator 17 being rotatable about an axis 19 such that a mandrel 18 of the servicing device 15 is aligned either with a mandrel of a transport carriage or with a storage mandrel.

The storage devices are preferably bipartite. A first part is movable in the aisle 13, and a second part is arranged stationarily in front of each storage aisle. The stationary part can be both moved up and down between the heights I, II of the conveyor tracks 10.1, 10.2 and pivoted about 180°. As a result, the delivered full packages are first received by the stationary part and subsequently transferred to the movable part for temporary storage.

Individual conveyors 20 transport the temporarily stored full packages to the control station 8 and package station 9 during the shift operation. To this end, the individual conveyors 20 are movable between one of the ends 21 of aisle 13 and the control station 8 as well as packing station 9. In the illustrated embodiment, this occurs on a peripheral transport track 22, whose special feature is a buffer track 23 extending in the form of parallel bypass loops 24 between the packing station 9 and the ends 21 of aisles 13.

The individual conveyors travel along this transport track in direction 25, it being possible to bring each individual conveyor 20 to a stopped position in the region of the ends 21 of aisles 13, in which the full packages are transferred by means of the servicing device 15.

For the transfer of full packages, each individual conveyor 20 is provided with a transport mandrel 26 which is horizontally directed with its free end into the storage aisle in each of the stopped positions. In the intermediate of the three storage aisles, the elevator is pivoted in such a manner and moved to such a height that two transport mandrels 26 of two adjacent individual conveyors 20 can be serviced by the two mandrels 18 of the elevator at the same time, as will be described in more detail below.

The peripheral transport track 22 is formed by a plurality of track rollers which are rotatably supported. Each individual conveyor 20 comprises a transport platform which moves with its underside along the roller track.

During their transportation, the packages are arranged horizontally. However, they are to be packed vertically. Thus, it is necessary to rotate the packages by 90°. In the embodiment of FIG. 8, a platform turning device 29 is provided for this purpose in front of the packing station 9 which rotates the transport platforms by 90° as they pass thereover. Subsequently, the full packages which are illustrated as circles in this rotated view, enter into the packing station 9, where they are palletized. Behind the packing station, the rotation by 90° is reversed by an inversely acting turning device 29.

An area of the temporary storage (not shown) may be reserved to temporarily store full packages which were singled out at the control station 8 as packages 28 of inferior quality. A track 27 bypassing packing station 9 is provided behind the control station 8 to return the packages 28 singled out because of inferior quality.

Further, an elevator 40 and an emergency service carriage 41 are provided in each of the service aisle 4.1, 4.2, which allows packages to be raised which in an emergency have been loaded by hand on the emergency service carriage, to the level of the transport carriage.

The procedure for handling full packages will now be described.

In the present embodiment, four packages are simultaneously produced on each of the take-up machines 2.

Each doffer 5 is provided with two parallel arms 42 which are spaced from one another by the distance of the transport gauge T, and designed to receive half the number of the packages which are simultaneously produced on a winding spindle. Thus, in the present embodiment, each of the arms 42 receives two packages 6. This operation is described in detail, for example, in DE-OS 29 39 675, the disclosure of which is incorporated by reference.

When a takeup machine 2 requests the doffing of packages, the associated doffer 5 travels to the corresponding takeup machine 2.1, 2.2, 2.3, 2.4, and calls for an available transport carriage 7.

Each transport carriage 7 has two transport mandrels 7.1 which are likewise spaced from one another by the distance T of the transport gauge.

The called transport carriage 7 positions itself in the associated doffer position, so that the transport mandrels 7.1 of the carriage 7 are exactly coaxial with the arms 42 of the doffer which still face the takeup machines.

The doffer receives on each of its two arms 42 respectively half of the full packages of a take-up machine, which is two, and then rotates its arms by 180°, so that the doffer arms carrying the full packages are associated to and exactly aligned with the transport mandrels 7.1 of the waiting carriage 7. The doffer now pushes the two packages from each of its arms onto the transport mandrels of the carriage, which are likewise designed to receive each two full packages.

The newly loaded transport carriage now moves with its load on the forward track 30 of its conveying path 10.1, 10.2 up to the end 32 of one of the storage aisles 13, each of which is invariably associated to one of the service aisles 4.1, 4.2. There, the mandrels 7.1 of transport carriage 7 are directed into the storage aisle, with the transport carriage stopping in a position, in which its mandrels can be brought in alignment with the mandrels 18 on elevator 17 of the servicing device 15. The elevator 17 on storage device 15 then moves its mandrels 18 which are likewise spaced from one another by transport gauge T, to transport height I, II at which the transport carriage has arrived. Subsequently, the servicing device 15 moves along aisle 13 toward the transport carriage, until the mandrels 18 of servicing device 15 are aligned with the mandrels 7.1 of transport carriage 7, and takes over respectively two full packages.

The unloaded transport carriage travels now on return track 31 past the empty tube magazine 33.1 or 33.2, loads there the number of empty tubes required for a winding spindle, and is temporarily moved to a standby position on the portion of the return track 31 forming the cul-de-sac 34, until a doffer requests empty tubes.

The loaded servicing device 15 now travels in the direction toward the other end 21 of storage aisle 13, with the elevator being moved to a height, in which two juxtaposed transport mandrels of the high-rise creel are unoccupied. Subsequently, a rotation by 90° occurs, so that the mandrels of servicing device 15 are in alignment with the free mandrels of the high-rise creel. The full packages are then delivered to the high-rise creel 12 and temporarily stored.

The functions as described above repeat themselves continuously during a full twenty-four hour day.

Unless the control station and the packing station are occupied, the individual conveyors 20 are moved in position at one end 21 of storage aisle 13. Each of the individual conveyors 20 possesses only one transport mandrel, however the dimensions of the transport conveyors are selected such that the two mandrels of two closely adjoining individual conveyors are likewise spaced from one another by the distance of transport gauge T.

In this position, the mandrels 18 of servicing devices 15 can be brought in alignment with the mandrels 26 of the two transport conveyors 20.

To this end, the servicing device 15 removes two full packages from two adjacent mandrels 14 of the creel 12, rotates by 90° in a direction toward the individual conveyors 20, and moves the mandrels 18 to a height which is identical with the height of the mandrels 26 of individual conveyors 20. Thereafter, the two individual conveyors 20 are started from their stopped position while loaded, so that they can leave for the control station and the packing station.

In the drawings and specification, there has been set forth a preferred embodiment of the invention, and although specific terms are employed, they are used in a generic and descriptive sense only and not for purposes of limitation.

That which is claimed is:

1. An apparatus for transporting empty yarn winding tubes from a tube magazine wherein the tubes are supported in vertically stacked, horizontal rows of tubes, and onto one or more transport mandrels of a transport carriage system, and comprising
   a horizontally disposed tube receiving tray having a plurality of parallel channels formed therein, with the channels being positioned laterally adjacent to each other so as to define a predetermined gauge, and with at least one of said channels defining a tube dispensing position,
   a tube transport rake comprising a horizontal bar and a plurality on tines extending perpendicularly from the bar and in a horizontal direction, and with said tines being laterally spaced apart so as to have a gauge which closely corresponds to said predetermined gauge of said channels,
   means mounting said rake for movement in a vertical direction and in a horizontal direction corresponding to the direction of said tines, and such that said rake can be moved horizontally into the uppermost row of tubes in said magazine with the tines entering respective ones of said tubes, and then moved vertically so that the tubes may be deposited in respective channels of said tray,
   tube dispensing means for longitudinally dispensing the tubes located at said tube dispensing position coaxially onto at least one transport mandrel or the like, and
   tube shifting means for laterally shifting the remaining tubes on said tray toward said tube dispensing position and so that at least one tube is shifted to said tube dispensing position and the tube dispensing means can then dispense said at least one shifted tube onto at least one additional transport mandrel.

2. The apparatus as defined in claim 1 wherein said tube dispensing means includes means for engaging the front end of a tube in said dispensing position and so as to displace the tube in a direction parallel to its longitudinal axis.

3. The apparatus as defined in claim 1 further comprising transfer tray means positioned in longitudinal alignment with said at least one channel defining said tube dispensing position, and wherein said tube dispensing means is designed for stepwise movement corresponding to the length of said channels or the length of said channels and the longitudinal length of said transfer tray means.

4. The apparatus as defined in claim 3 wherein said transfer tray means has a longitudinal length which is an integral multiple of the longitudinal length of said channels.

5. The apparatus as defined in claim 1 wherein said horizontal bar of said tube transport rake is rotatable about its axis so that the tines may be rotated into a vertically upward direction.

6. The apparatus as defined in claim 1 wherein said tube receiving tray defines opposite lateral side edges, and wherein said tube dispensing position is located immediately adjacent one of said lateral side edges, and said tube shifting means is mounted adjacent the other lateral side edge and is moveable toward said one lateral side edge.

7. The apparatus as defined in claim 1 wherein said channels are fixedly positioned with respect to each other, and said tube shifting means is moveable stepwise a distance corresponding to said predetermined gauge of said channels.

8. The apparatus as defined in claim 1 wherein said tube receiving tray comprises a plurality of separate elements, with each element defining one of said tube receiving channels, and with said elements being mounted in an endless arrangement defining an upper run and a lower run, and said tube shifting means comprises drive means for laterally moving said endless arrangement of elements.

9. A textile yarn processing apparatus comprising
a plurality of yarn winding machines arranged in parallel rows to define a service aisle therebetween,
doffer means adapted to move along said service aisle for removing full packages from the winding machines and replacing the same with empty yarn winding tubes,
transport carriage means movable along a path of travel which includes said service aisle and a remote unloading station, and including transport mandrel means for receiving at least one full package from said doffing means and delivering the same to said unloading station, and for receiving at least one empty winding tube on its travel back to said service aisle and delivering the same to said doffer means,
magazine means positioned along said path of travel for supporting a plurality of empty yarn winding tubes in vertically stacked, horizontal rows of tubes,
means for transporting empty yarn winding tubes from said magazine and onto said transport mandrel means of said transport carriage means, and comprising
(a) a horizontally disposed tube receiving tray having a plurality of parallel channels formed therein, with the channels being positioned laterally adjacent to each other so as to define a predetermined gauge, and with at least one of said channels defining a tube dispensing position,
(b) a tube transport rake comprising a horizontal bar and a plurality on tines extending perpendicularly from the bar and in a horizontal direction, and with said tines being laterally spaced apart so as to have a gauge which closely corresponds to said predetermined gauge of said channels,
(c) means mounting said rake for movement in a vertical direction and in a horizontal direction corresponding to the direction of said tines, and such that said rake can be moved horizontally into the uppermost row of tubes in said magazine with the tines entering respective ones of said tubes, and then moved vertically so that the tubes may be deposited in respective channels of said tray,
(d) tube dispensing means for longitudinally dispensing the tubes located at said tube dispensing position coaxially onto said transport mandrel means, and
(e) tube shifting means for laterally shifting the remaining tubes on said tray toward said tube dispensing position and so that at least one tube is shifted to said tube dispensing position and the tube dispensing means can then dispense said at least one shifted tube onto at least one additional transport mandrel means.

10. The textile yarn processing apparatus as defined in claim 9 wherein said magazine comprises a receptacle adapted to receive an open box like container therein, with the box like container having an open vertical side facing said tube transport rake, and with the lateral width of said container being substantially an integral multiple of the diameter of the tubes positioned within said container.

11. The textile yarn processing apparatus as defined in claim 9 wherein said transport mandrel means of said transport carriage means comprises a plurality of vertically separated transport mandrels, and said transporting means comprises a plurality of said tube receiving trays positioned in vertically separated planes which are horizontally aligned with respective ones of said mandrels, and with each of said trays having said tube dispensing means and said tube shifting means.

12. The textile yarn processing apparatus as defined in claim 9 wherein said transport mandrel means of said transport carriage means comprises a plurality of horizontally separated transport mandrels, and said transporting means comprises a plurality of said tube dispensing means which are adapted to be aligned with respective ones of said mandrels.

13. The textile yarn processing apparatus as defined in claim 9 wherein said transport mandrel means of said transport carriage means comprises a plurality of horizontally separated transport mandrels, and wherein said transporting means comprises a pair of said tube receiving trays which are horizontally aligned and with the channels thereof being parallel to each other, and wherein said transporting means comprises a pair of said tube dispensing means which are mounted on respective ones of said trays.

* * * * *